United States Patent
Zuzelski et al.

(10) Patent No.: US 10,471,990 B2
(45) Date of Patent: Nov. 12, 2019

(54) STEERING COLUMN FEEL EMULATOR MECHANICAL STOPS

(71) Applicant: GM GLOBAL TECHNOLOGY OPERATIONS LLC, Detroit, MI (US)

(72) Inventors: John T. Zuzelski, Clarkston, MI (US); David Juarez, Grosse Pointe Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 15/627,643

(22) Filed: Jun. 20, 2017

(65) Prior Publication Data

US 2018/0362079 A1    Dec. 20, 2018

(51) Int. Cl.
*B62D 15/02* (2006.01)
*B62D 3/02* (2006.01)
*B62D 5/04* (2006.01)
*B62D 1/16* (2006.01)
*B62D 5/00* (2006.01)

(52) U.S. Cl.
CPC .......... *B62D 15/0205* (2013.01); *B62D 1/16* (2013.01); *B62D 3/02* (2013.01); *B62D 5/001* (2013.01); *B62D 5/005* (2013.01); *B62D 5/04* (2013.01)

(58) Field of Classification Search
CPC ....... B62D 15/02; B62D 15/0205; B62D 3/02
USPC ................................................ 180/402, 444
See application file for complete search history.

(56) References Cited

U.S. PATENT DOCUMENTS

| 2,934,035 | A * | 4/1960 | Hardy | B62D 15/0205 116/31 |
| 6,410,909 | B1 * | 6/2002 | Rudolph | B62D 15/02 250/231.13 |
| 7,410,028 | B2 * | 8/2008 | Chikaraishi | B62D 5/006 180/402 |
| 2003/0184072 | A1 * | 10/2003 | Andonian | B62D 1/16 280/779 |
| 2004/0124044 | A1 * | 7/2004 | Landrieve | B62D 1/16 188/218 R |
| 2007/0194899 | A1 * | 8/2007 | Lipman | B62D 15/0205 340/456 |
| 2014/0222260 | A1 * | 8/2014 | Anson | B63H 25/24 701/21 |

\* cited by examiner

*Primary Examiner* — Tony H Winner
(74) *Attorney, Agent, or Firm* — Quinn IP Law (57) ABSTRACT

A steering system for an automotive vehicle is disclosed. The steering system includes, in some embodiments, a steering shaft, a steering column jacket encircling at least a portion of the steering shaft, an emulator enclosed within a housing, the emulator coupled to the steering shaft, and a travel limiter assembly enclosed within the housing and coupled with the steering shaft, the travel limiter assembly comprising at least one rotational member having a pin and a groove configured to receive the pin, the groove including a stop portion. In some embodiments, the at least one rotational member and at least a portion of the steering shaft rotates within the housing and the pin travels within the groove until the pin encounters the stop portion after a predetermined degree of rotation of the steering shaft.

16 Claims, 7 Drawing Sheets

STEERING COLUMN FEEL EMULATOR MECHANICAL STOPS

INTRODUCTION

The present invention relates generally to the field of vehicles and, more specifically, to a steer-by-wire system for a vehicle that includes mechanical torque limiters to limit the rotational travel of the steering shaft.

A steer-by-wire system allows the vehicle to be steered electronically, i.e., without a direct mechanical link between the steering wheel and the vehicle wheels. Steer-by-wire systems allow vehicle interior design freedoms that might otherwise not be possible with a conventional steering system having a mechanical linkage. Further, steer-by-wire systems typically have fewer parts and reduced complexity than conventional steering systems.

Many of the steering systems being developed for steer-by-wire applications utilize electro-mechanical clutches or electric motors to act as travel stops to counter the torque input of the driver. The electric motors are sized to handle the maximum torque input of the driver, which increases the mass, cost, and energy consumption of the steering system.

SUMMARY

Embodiments according to the present disclosure provide a number of advantages. For example, embodiments according to the present disclosure provide a simple, lightweight, and inexpensive solution to limit the rotational travel of the steering shaft and/or steering wheel of a steer-by-wire system while satisfying desired steering angle limits.

In one aspect, a steering system for an automotive vehicle includes a steering shaft, a steering column jacket encircling at least a portion of the steering shaft, an emulator enclosed within a housing, the emulator coupled to the steering shaft, and a travel limiter assembly enclosed within the housing and coupled with the steering shaft, the travel limiter assembly including at least one rotational member having a pin and a groove configured to receive the pin, the groove including a stop portion. The at least one rotational member and at least a portion of the steering shaft rotates within the housing and the pin travels within the groove until the pin encounters the stop portion after a predetermined degree of rotation of the steering shaft.

In some aspects, the at least one rotational member is a disk cam.

In some aspects, the at least one rotational member is a gear.

In some aspects, the travel limiter assembly includes a first cam fixedly coupled to the steering column jacket and having a first groove formed in a first side surface, a second cam having a first pin extending from a first side surface, the first pin configured to fit within the first groove and a second groove formed in a second side surface, a third cam having a second pin extending from a first side surface, the second pin configured to fit within the second groove, and a third pin extending from a second side surface, and a fourth cam fixedly coupled to the steering shaft and having a third groove configured to receive the third pin.

In some aspects, the fourth cam rotates with the steering shaft and the third pin travels in the third groove until reaching a third stop portion, resulting in rotation of the third cam in the same direction as the steering shaft, the second pin traveling in the second groove until reaching a second stop portion, resulting in rotation of the second cam in the same direction as the steering shaft, the first pin traveling in the first groove until reaching a first stop portion of the first groove.

In some aspects, when the first pin reaches the first stop portion, rotation of the steering shaft is arrested.

In some aspects, the second and third cams freely rotate with respect to the steering shaft and the fourth cam rotates with the steering shaft.

In some aspects, the housing includes the groove and the stop portion and the travel limiter assembly includes a planetary gear set including a sun gear coupled to the steering shaft, a planet carrier that supports at least one planet gear configured to engage with the sun gear, and a ring gear configured to engage with the at least one planet gear, the ring gear including the pin configured to travel within the groove as the ring gear rotates.

In some aspects, when the pin encounters the stop portion, rotation of the steering shaft is arrested.

In some aspects, a width of the stop portion is tunable based on a desired steering angle limit.

In another aspect, an automotive vehicle includes a plurality of vehicle wheels and a steering system. The steering system includes a steering shaft, a steering column jacket encircling at least a portion of the steering shaft, an emulator enclosed within a housing, the emulator coupled to the steering shaft, and a travel limiter assembly enclosed within the housing and coupled with the steering shaft, the travel limiter assembly comprising at least one rotational member having a pin and a groove configured to receive the pin, the groove including a stop portion. The at least one rotational member and at least a portion of the steering shaft rotates within the housing and the pin travels within the groove until the pin encounters the stop portion after a predetermined degree of rotation of the steering shaft. The steering system is connected to the vehicle wheels for steering the vehicle wheels.

In some aspects, The automotive vehicle further includes a controller configured to control the steering system and at least one vehicle sensor electrically connected to the controller, the controller configured to receive a steering position signal from the at least one vehicle sensor and generate a motor drive signal for steering the vehicle wheels.

In some aspects, a width of the stop portion is tunable based on a desired steering angle limit.

In some aspects, the travel limiter assembly includes a first cam fixedly coupled to the steering column jacket and having a first groove formed in a first side surface, a second cam having a first pin extending from a first side surface, the first pin configured to fit within the first groove and a second groove formed in a second side surface, a third cam having a second pin extending from a first side surface, the second pin configured to fit within the second groove, and a third pin extending from a second side surface, and a fourth cam fixedly coupled to the steering shaft and having a third groove configured to receive the third pin.

In some aspects, the fourth cam rotates with the steering shaft and the third pin travels in the third groove until reaching a third stop portion, resulting in rotation of the third cam in the same direction as the steering shaft, the second pin traveling in the second groove until reaching a second stop portion, resulting in rotation of the second cam in the same direction as the steering shaft, the first pin traveling in the first groove until reaching a first stop portion of the first groove.

In some aspects, when the first pin reaches the first stop portion, rotation of the steering shaft is arrested.

In some aspects, the housing includes the groove and the stop portion and the travel limiter assembly includes a planetary gear set including a sun gear coupled to the steering shaft, a planet carrier that supports at least one planet gear configured to engage with the sun gear, and a ring gear configured to engage with the at least one planet gear, the ring gear including the pin configured to travel within the groove as the ring gear rotates.

In some aspects, when the pin encounters the stop portion, rotation of the steering shaft is arrested.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first." "second," "third," and so on may be used to describe separate components. Such terminology may include the words specifically mentioned above, derivatives thereof, and words of similar import.

In the execution of steer-by-wire technology, the intermediate shaft is removed between the steering column and the steering gear. This allows the steering column and steering wheel to rotate without travel limits. Current steering columns rotate approximately +/−1.5 revolutions and incorporate a supplemental inflatable restraint (SIR) coil that is designed based on this steering angle limit. Embodiments discussed herein include a mechanical travel limiter system to prevent overtravel or break of the airbag electrical circuit and provide driver feedback indicating when the steering gear is at the end of travel.

Figure 1:
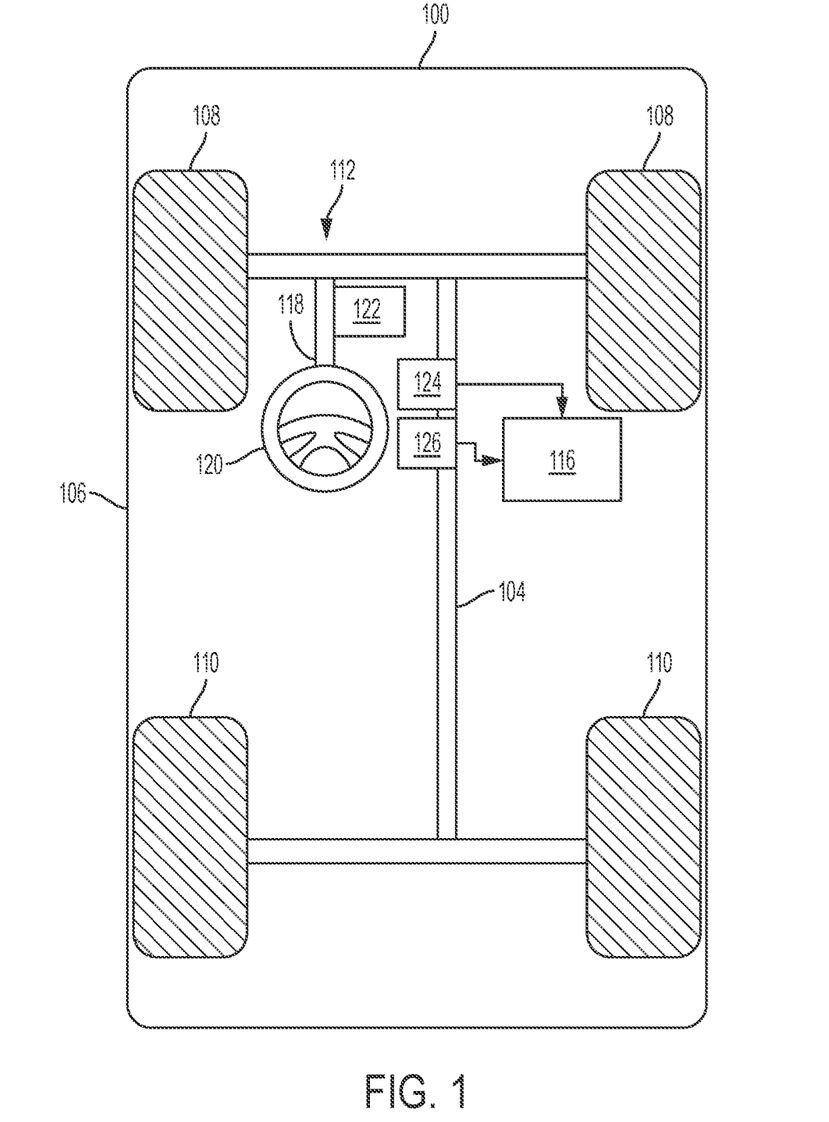
FIG. 1 is a functional block diagram of a vehicle that includes, among other features, a steering system in accordance with exemplary embodiments.
Figure 2:
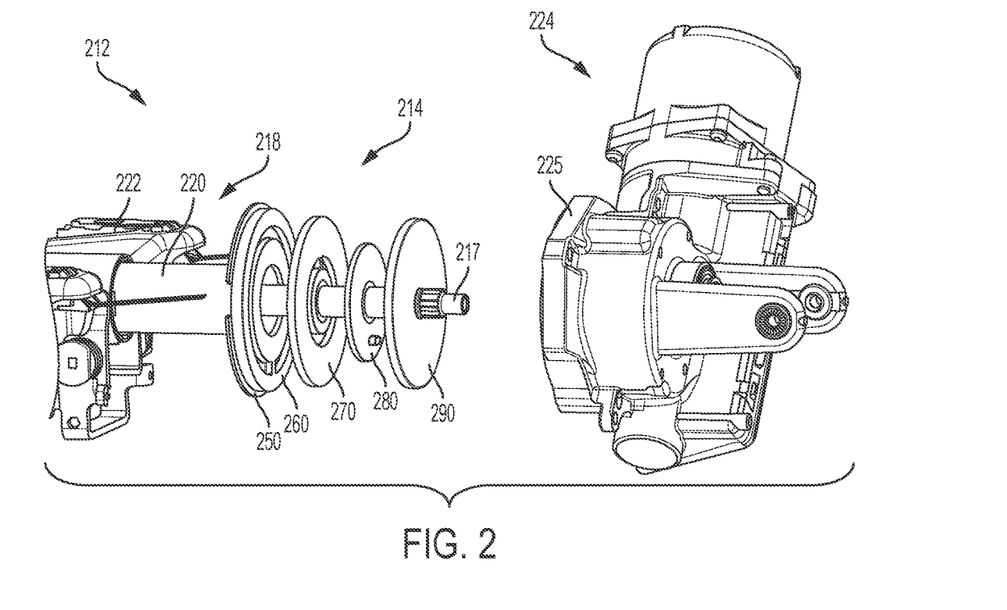
FIG. 2 is a schematic partially-exploded diagram of a steer-by-wire steering system with a mechanical limiter system in accordance with exemplary embodiments.

With reference to FIG. 1, a vehicle 100 is shown that includes a steering system 112 in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 100 generally includes a chassis 104, a body 106, front wheels 108, rear wheels 110, a steering system 112, and a control system 116. The body 106 is arranged on the chassis 104 and substantially encloses the other components of the vehicle 100. The body 106 and the chassis 104 may jointly form a frame. The wheels 108-110 are each rotationally coupled to the chassis 104 near a respective corner of the body 106.

As can be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In some embodiments, the steering system 112 includes a steering column assembly 118 and a steering wheel 120. In various embodiments, the steering system 112 is a steer-by-wire system that makes use of electric motors to turn the wheels, sensors to determine how much steering force to apply, and steering feel emulators to provide haptic feedback to the driver.

In various embodiments, the steering system 112 includes a motor 122 that is coupled to the steering system 112, and that provides torque or force to one or more of the wheels 108-110. The motor 122 can be coupled to the rotatable shaft of the steering column assembly 118. The steering system 112 further includes one or more sensors that sense observable conditions of the steering system 112. In various embodiments, the steering system 112 includes a torque sensor 124 and a position sensor 126. The torque sensor 124 senses a rotational torque applied to the steering system by for example, a driver of the vehicle 100 via the steering wheel 120 and generates torque signals based thereon. The position sensor 126 senses a rotational position of the steering wheel 120 and generates position signals based thereon.

The control system 116 receives the sensor signals and monitors operation of the steering system 112 based thereon. In general, the control system 116 receives the torque sensor signals, and processes the torque sensor signals over a certain time period to determine the torque to apply to the wheels.

Many of the steering systems being developed for steer-by-wire applications utilize electro-mechanical clutches or electric motors to act as travel stops to counter the torque input of the driver. The electric motors are sized to handle the maximum torque input of the driver, which increases the mass, cost, and energy consumption of the steering system.

Instead of a large electric motor to counteract the maximum torque input of the driver, embodiments of the steering systems discussed herein include end of rotation mechanical travel stops to limit the rotational travel of the steering shaft and/or steering wheel of a steer-by-wire steering column. In some embodiments, the mechanical travel stops are connected to an emulator to provide haptic feedback to the driver when the steering gear is at the end of travel. In some embodiments, the mechanical travel stops are rotational disk cams with stop pins or lugs, as discussed in greater detail herein. In some embodiments, the mechanical travel stops include a planetary gear set with stop pins or lugs, as discussed in greater detail herein.

FIGS. 2-7 are schematic diagrams of a steering system 212 that includes a mechanical travel limiter assembly 214, according to an embodiment. The system 212 includes a steering column assembly 218 connected to a motor/emulator 224 contained within a housing 225. In some embodiments, the motor/emulator 224 provides haptic feedback to the driver to indicate when the steering gear is at the end of travel. In some embodiments, the steering column assembly 218 is connected to the instrumental panel (IP) of the vehicle 100 at one or more connection locations. The steering column assembly 218 includes a steering shaft 217 and a steering column jacket 220 that at least partially surrounds the steering shaft 217. A supplemental inflatable restraint (SIR) coil 222 is connected to the steering column jacket 220 and interfaces with the steering wheel 120. The steering wheel 120 is connected to the steering shaft 217. As the steering wheel 120 rotates, it will also rotate the SIR coil 222 and the steering shaft 217.

The mechanical travel limiter assembly 214 includes, in some embodiments, a plurality of rotational disk cams 260, 270, 280, 290. In some embodiments, a ring 250 is connected to one of the cams to secure and align the plurality of cams within the housing 225 of the motor/emulator 224.

With reference to FIGS. 2-5, the travel limiter assembly 214 includes a first cam 260 fixed to the steering column jacket 220 (that is, the first cam 260 is fixed and does not rotate). The first cam 260 includes a left hand surface or first face 261 and a right hand surface or second face 262 separated by an edge surface 263. The edge surface 263 defines a width of the first cam 260.

Figure 3:
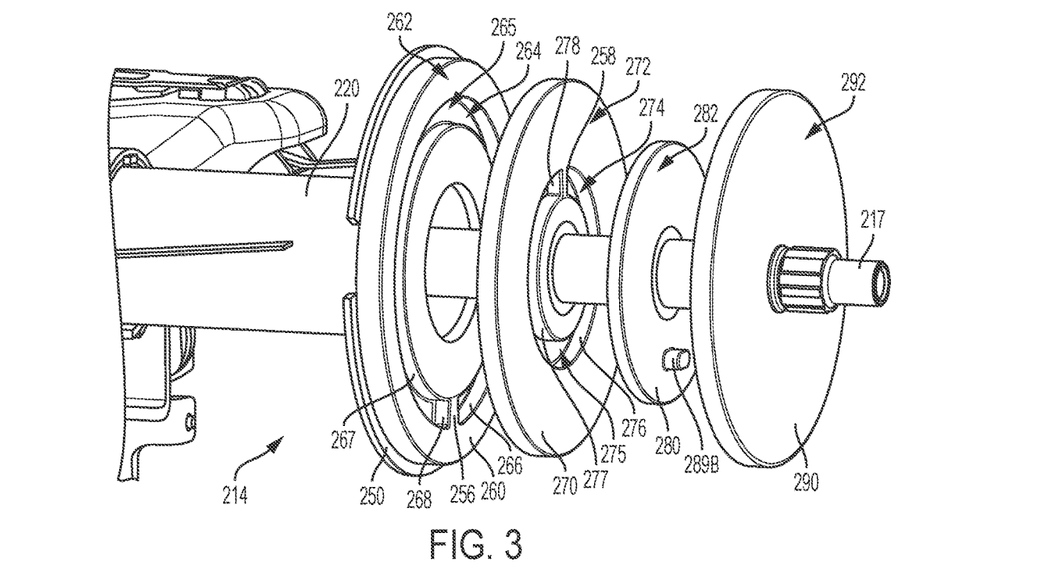
FIG. 3 is a schematic partially-exploded diagram of the mechanical limiter system of FIG. 2.

The second face 262 includes a groove 264. The groove 264 is defined by a groove surface 265, an outer sidewall 266, an inner sidewall 267, and groove endwalls 268 (one endwall 268 is shown in FIG. 3). The contiguous groove surface 265, the outer sidewall 266, the inner sidewall 267, and the groove endwalls 268 define the groove 264 that is depressed from the second face 262 by a depth defined by the sidewalls 266, 267 and endwalls 268. In some embodiments, the groove 264 is a partial circular groove. The endwalls 268 define a first groove stop portion 256. The stop portion 256 interrupts the groove 264 such that the groove 264 does not define a full circular groove in the second face 262. The width of the stop portion 256 is variable and may be adjusted based on the desired steering angle limit.

A second cam 270 abuts against the first cam 260. The second cam 270 is free to rotate about the steering shaft 217 via a first bearing 252 (see FIG. 5). The second cam 270 includes a left hand surface or first face 271 and a right hand surface or second face 272 separated by an edge surface 273. The edge surface 273 defines a width of the second cam 270.

Figure 4:
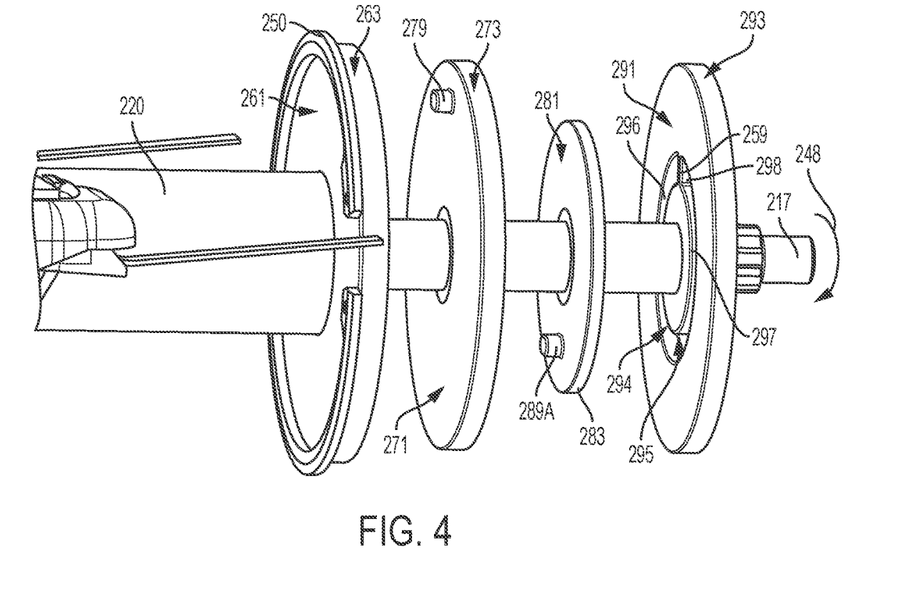
FIG. 4 is another perspective view of the partially-exploded diagram of the mechanical limiter system shown in FIG. 2.
Figure 5:
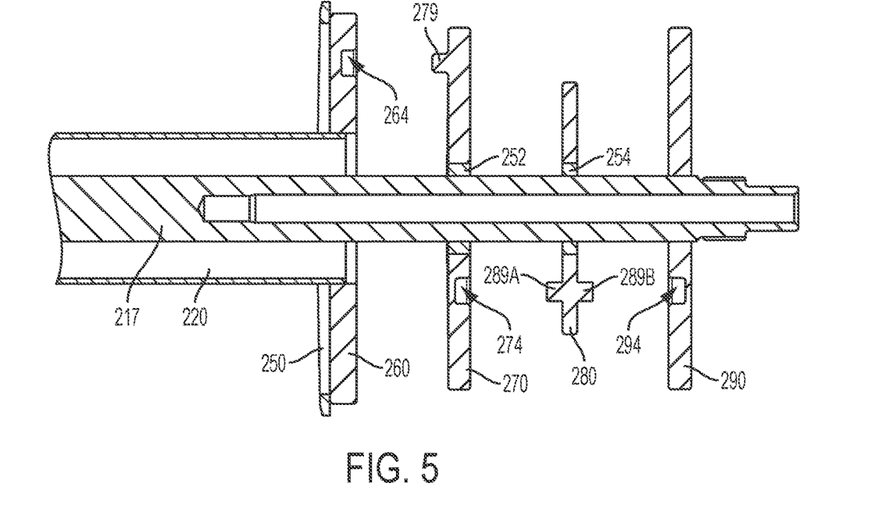
FIG. 5 is a schematic cross-sectional view of the mechanical limiter system shown in FIG. 2.

With reference to FIGS. 4 and 5, the first face 271 includes a pin or lug 279 extending from and generally perpendicular to the first face 271 of the second cam 270. The pin or lug 279 is positioned such that the lug 279 fits within the groove 264 of the first cam 260. In some embodiments, the lug 279 is a cylindrical extension extending outwards from the surface of the second cam 270. However, as may be appreciated, the lug 279 may have any other cross-sectional shape including square, rectangular, oval, etc.

As shown in FIGS. 3 and 5, the second face 272 of the second cam 270 includes a groove 274. The groove 274 is defined by an outer sidewall 276, an inner sidewall 277, a groove surface 275, and groove endwalls 278 (one endwall 278 is shown in FIG. 3). The contiguous groove surface 275, outer sidewall 276, inner sidewall 277, and groove endwalls 278 define the groove 274 that is depressed from the second face 272 by a depth defined by the sidewalls 276, 277 and the endwalls 278. In some embodiments, the groove 274 is a partial circular-shaped groove. The endwalls 278 further define a second groove stop portion 258. The stop portion 258 interrupts the groove 274 such that the groove 274 does not define a full circular groove in the second face 272. The width of the stop portion 258 is variable and may be adjusted based on the desired steering angle limit.

A third cam 280 abuts against the second cam 270. The third cam 280 is free to rotate about the steering shaft 217 via a second bearing 254 (see FIG. 5). The third cam 280 includes a left hand surface or first face 281 and a right hand surface or second face 282 separated by an edge surface 283. The edge surface 283 defines a width of the second cam 280.

With reference to FIGS. 4 and 5, the first face 281 includes a first pin or lug 289A extending from and generally perpendicular to the first face 281 of the third cam 280. The first pin or lug 289A is positioned such that the lug 289A fits within the second groove 274 of the second cam 270. In some embodiments, the lug 289A is a cylindrical extension extending outwards from the left side surface of the third cam 280. However, as may be appreciated, the lug 289A may have any other cross-sectional shape including square, rectangular, oval, etc.

As shown in FIGS. 3 and 5, the second face 282 of the third cam 280 includes a second pin or lug 289B extending from and generally perpendicular to the second face 282 of the third cam 280. The second pin or lug 289B is positioned such that the lug 289B fits within a groove 294 of the fourth cam 290 (discussed in greater detail herein). In some embodiments, the lug 289B is a cylindrical extension extending outwards from the side surface of the third cam 280. However, as may be appreciated, the lug 289B may have any other cross-sectional shape including square, rectangular, oval, etc. As shown in FIG. 5, in some embodiments, the lugs 289A, 289B may be located on opposite sides of the third cam 280 such that the third cam 280 is symmetrical about an axis passing radially through the third cam 280. While two lugs 289A, 289B are shown in FIG. 5, as may be appreciated, the third cam 280 may include more or fewer lugs 289A, 289B.

A fourth cam 290 abuts against the third cam 280. The fourth cam 290 is fixed with respect to the steering shaft 217 such that the fourth cam 290 rotates with the steering shaft 217 (see FIG. 5). The fourth cam 290 includes a left hand surface or first face 291 and a right hand surface or second face 292 separated by an edge surface 293. The edge surface 293 defines a width of the fourth cam 290.

As shown in FIGS. 4 and 5, the first face 291 of the fourth cam 290 includes a groove 294. The groove 294 is defined by an outer sidewall 296, an inner sidewall 297, a groove surface 295, and groove endwalls 298 (one endwall 298 is shown in FIG. 4). The contiguous groove surface 295, outer sidewall 296, inner sidewall 297, and groove endwalls 298 define the groove 294 that is depressed from the first face 291 by a depth defined by the sidewalls 296, 297 and endwalls 298. In some embodiments, the groove 294 is a partial circular-shaped groove. The endwalls 298 further define a groove stop portion 259. The stop portion 259 interrupts the groove 294 such that the groove 294 does not define a full circular groove in the first face 291. The width of the stop portion 259 is variable and may be adjusted based on the desired steering angle limit.

Figure 6:
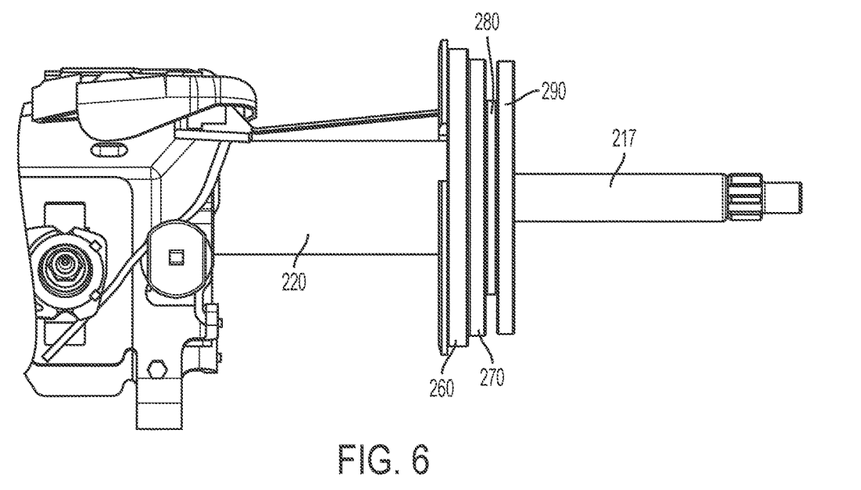
FIG. 6 is a schematic side view of the steer-by-wire system shown in FIG. 2.
Figure 7:
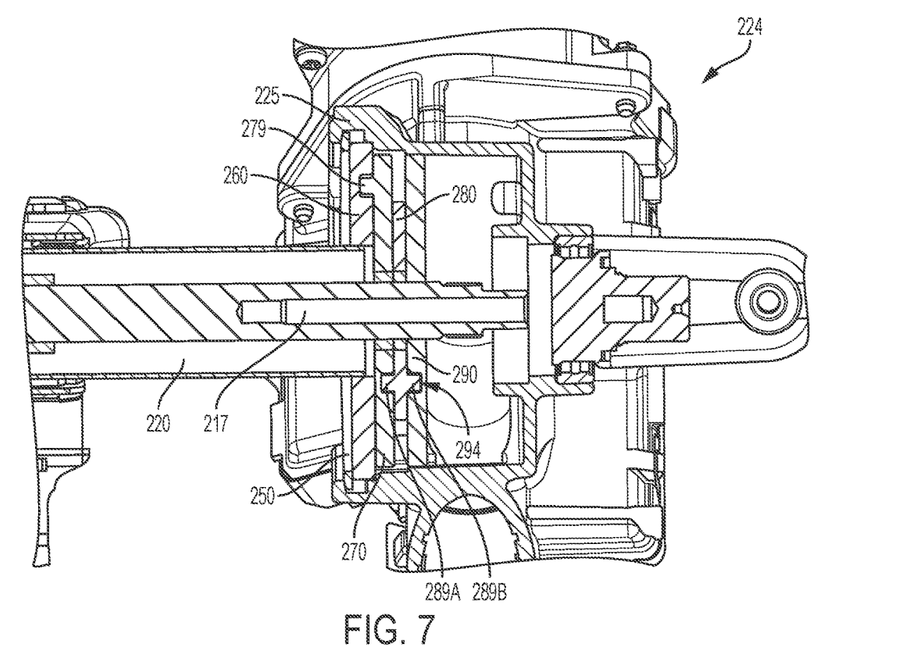
FIG. 7 is a schematic cross-sectional view of the mechanical limiter system of FIG. 2 in accordance with exemplary embodiments.

With reference to FIGS. 6 and 7, when assembled as part of the steering system 212, the cams 260, 270, 280, 290 fit closely together such that the lugs fit within corresponding grooves in adjacent cams. For example, as shown in FIG. 7, the groove 264 of the first cam 260 is configured to receive the lug 279 of the second cam 270. Similarly, the groove 274 of the second cam 270 is configured to receive the lug 289A of the third cam 280 and the groove 294 of the fourth cam 290 is configured to receive the lug 289B of the third cam 280.

In some embodiments, the lugs 279, 289A, 289B extend different distances from the surfaces of the cams (that is, the lugs have substantially different lengths). In some embodiments, the lugs have substantially the same length. Similarly, in some embodiments, the lugs 279, 289A, 289B may have substantially the same width, or may have substantially different widths. The length and width of each of the lugs 279, 289A, 289B is selectable based on, for example and without limitation, sizing and packaging constraints and the input torque being countered by the mechanical stops, among other factors.

The cams 260, 270, 280, 290 fit within the housing 225 of the motor/emulator 224 as shown in FIG. 7. In some embodiments, the ring 250, which is affixed or connected to the first cam 260, fits within the housing of the motor/emulator to align the mechanical travel limiter assembly 214 with respect to the steering shaft 217.

As the steering shaft 217 rotates, the mechanical travel limiter system 214 limits the steering angle and acts as a travel stop to counter the torque of the driver/operator. For example, as the steering shaft 217 rotates in a clockwise direction (that is, in the direction indicated by the arrow 248 shown on FIG. 4), the fourth cam 290, which is directly connected to and rotates with the steering shaft 217, also rotates in the direction 248. As discussed herein, the lug 289B fits into and travels within the groove 294 in the fourth cam 290. As the fourth cam 290 rotates, the groove 294 rotates until the lug 289B encounters one end of the groove 294 and abuts against the endwall 298 that partially defines the stop portion 259. As the fourth cam 290 continues to rotate with the steering shaft 217, the force of the endwall 298 against the lug 289B also turns the third cam 280.

As discussed herein, in some embodiments, as shown in FIG. 5, the third cam 280 also includes the lug 289A that fits into and travels within the groove 274 of the second cam 270. As the third cam 280 rotates due to the force of the endwall 298 against the lug 289B, the lug 289A travels within the groove 274. When the third and fourth cams 280, 290 have rotated such that the lug 289A encounters one end of the groove 274, the lug 289A abuts against the endwall 278 that partially defines the stop portion 258. As the third and fourth cams 280, 290 continue to rotate, the force of the lug 289A against the endwall 278 also turns the second cam 270.

As illustrated in FIG. 5, the second cam 270 includes the lug 279 that fits into and travels within the groove 264 in the first cam 260. As the second cam 270 rotates with the third and fourth cams 280, 290, the lug 279 travels within the groove 264. As discussed herein, the first cam 260 is directly connected to the steering column jacket 220, that is, the first cam 260 does not rotate. Therefore, as the lug 279 travels within the groove 264 and encounters one end of the groove 264, the force of the endwall 268 against the lug 279 stops further rotation of the cams 270, 280, 290 and the steering shaft 217, thereby limiting the steering angle of the steering system 212 in the direction indicated by the arrow 248.

As the steering shaft 217 rotates in a direction opposite that of the direction indicated by the arrow 248 in FIG. 4, the rotation of the cam disks proceeds similar to the sequence discussed above. Initially, the fourth cam 290 rotates with the steering shaft 217. As the fourth cam 290 rotates, the groove 294 rotates until the lug 289B encounters the other end of the groove 294 at the endwall 298. The force of the endwall 298 against the lug 289B also turns the third cam 280.

As the third cam 280 rotates with the fourth cam 290, the lug 289A travels within the groove 274 of the second cam 270. When the lug 289A encounters the opposite end of the groove 274 at the other endwall 278, the force of the lug 289A against the endwall 278 also turns the second cam 270. Finally, as the lug 279 rotates with the second cam 270, the lug 279 travels within the groove 264 of the first cam 260 until the lug 279 encounters the other end of the groove 264 at the other endwall 268. Since the first cam 260 is fixed to the steering column jacket 220 and does not rotate, the force of the other endwall 268 against the lug 279 stops further rotation of the cams 270, 280, 290 and the steering shaft 217, thereby limiting the steering angle of the steering system 212 in the opposite direction.

In some embodiments, as shown in FIGS. 2-7, the cams 260, 270, 280, 290 are circular cams having different radii. The size of each of the cams 260, 270, 280, 290 is tunable based on, for example and without limitation, size and packaging constraints and the desired steering angle limit. Additionally, the width of each of the stop portions 256, 258, 259 (that is, the space between each of endwalls 268, the space between each of the endwalls 278, and the same between each of the endwalls 298) is also selectable based on, for example and without limitation, the desired steering angle limit.

FIGS. 8-13 illustrate another embodiment of a mechanical travel limiter assembly 314 for a steering system 312. The system 312 includes a steering column assembly 318 connected to a motor/emulator 324. In some embodiments, the steering column assembly 318 is connected to the instrumental panel (IP) of the vehicle 100 at one or more connection locations. The steering column assembly 318 includes a steering shaft 317 and a steering column jacket 320 that at least partially surrounds the steering shaft 317. A SIR coil 222 is connected to the steering column jacket 320 and interfaces to the steering wheel 120. The steering wheel 120 is connected to the steering shaft 317. As the steering wheel 120 rotates, it will also rotate the SIR coil 222 and the steering shaft 317.

Figure 8:
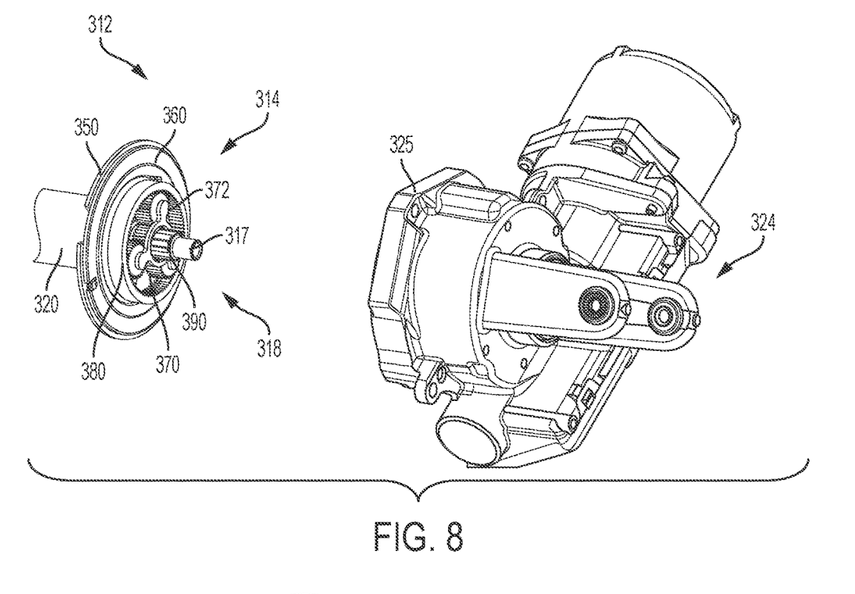
FIG. 8 is a schematic partially-exploded view of a steer-by-wire steering system with a mechanical limiter system in accordance with exemplary embodiments.
Figure 9:
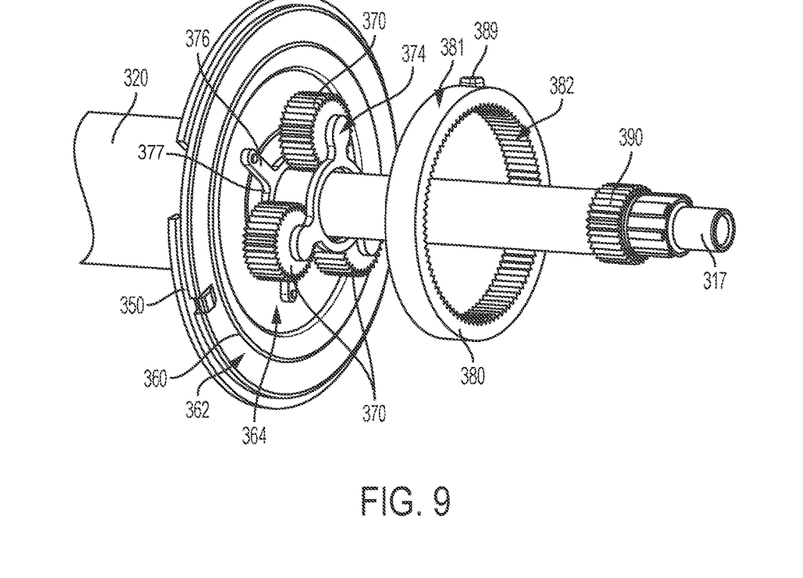
FIG. 9 is a schematic, partially-exploded diagram of the mechanical limiter system shown in FIG. 8.

In some embodiments, the mechanical travel limiter assembly 314 includes a plurality of rotatable gears 370, 380, 390. A cover plate 360 and a ring 350 secure and align the plurality of gears within the housing 325 of the motor/emulator 324.

Figure 12:
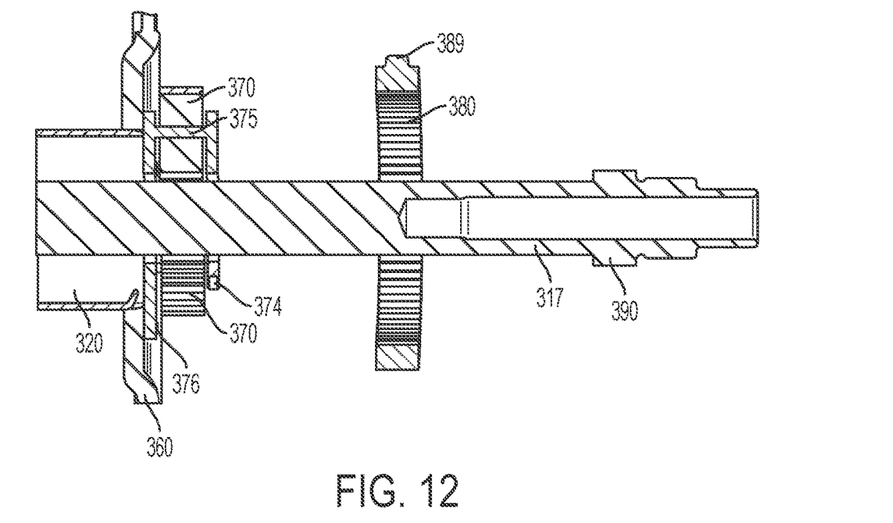
FIG. 12 is a schematic partially exploded cross-sectional view of the steering system of FIG. 8.
Figure 13:
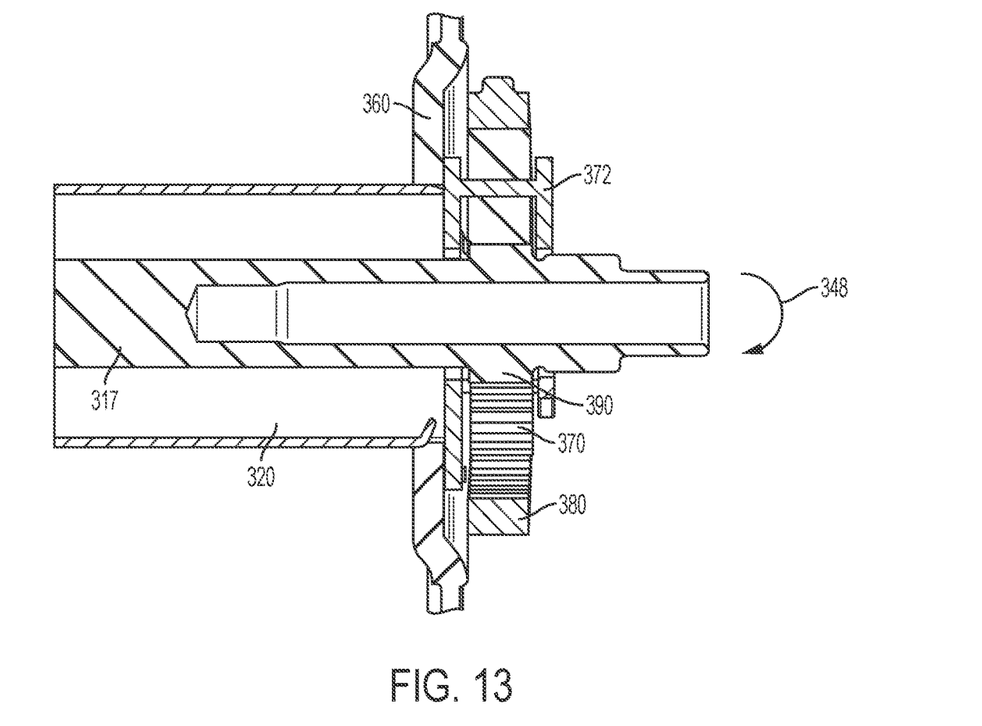
FIG. 13 is a schematic partial cross-sectional view of the steering system of FIG. 8.

With reference to FIGS. 8 and 9, the travel limiter assembly 314 includes a planetary gear set. A simple planetary gear set is a type of fixed gearing arrangement. A planet carrier supports a set of planet gears such that the planet gears rotate with respect to the planet carrier. External gear teeth on the planet gears mesh with external gear teeth on a sun gear and with internal gear teeth on a ring gear. The sun gear and ring gear are supported to rotate about the same axis as the carrier. The planetary gear set includes a plurality of planet gears 370 (three shown) secured to the cover plate 360 by a carrier 372. The carrier 372 includes a plurality of lobes 374. The number of lobes 374 equals the number of planet gears 370. As shown in FIGS. 12 and 13, the lobes 374 include an axis 375 passing through the center of each of the planet gears 370. The axes 375 of the lobes 374 connect to a connecting ring 377 having a plurality of connection lobes 376. The connection lobes 376 provide points of mechanical connection between the carrier 372 and the cover plate 360.

In some embodiments, the cover plate 360 includes an outer surface 362 and a depressed surface 364 located radially inwards from the outer surface 362. In some embodiments, the depressed surface 364 defines a plane separate from and parallel to a plane defined by the outer surface 362. In some embodiments, the connection lobes 376 are fastened to the depressed surface 364 of the cover plate 360 using any type of mechanical fastener such as, for example and without limitation, screws, bolts, etc.

The planet gears 370 surround a sun gear 390. In some embodiments, the sun gear 390 is mounted to, or formed integrally with, the steering shaft 317. The sun gear 390 has a plurality of serrations or teeth configured to engage or mesh with the teeth of the planet gears 370. A ring gear 380 encircles the planet gears 370. The ring gear 380 includes an outside surface 381 and an inner surface 382. The outside surface 381 includes at least one pin or lug 389. In some embodiments, the lug 389 is a cylindrical extension extending radially outwards from the outside surface 381 of the ring gear 380. However, as may be appreciated, the lug 389 may have any other cross-sectional shape, including square, rectangular, oval, etc. Similar to the lugs discussed herein with respect to the travel limiter system 214, the lug 389 is configured to interact with an endwall of a groove to limit the steering angle, as discussed in greater detail herein. The inner surface 382 of the ring gear 380 includes a plurality of serrations or teeth configured to engage or mesh with the teeth of the planet gears 370.

Figure 10:
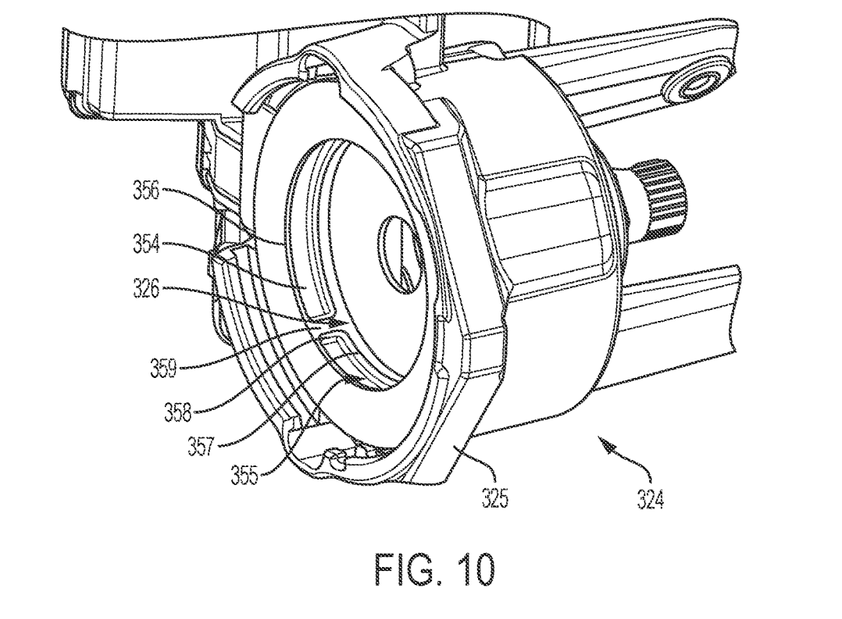
FIG. 10 is a schematic perspective view of a motor/emulator for the steer-by-wire steering system of FIG. 8.
Figure 11:
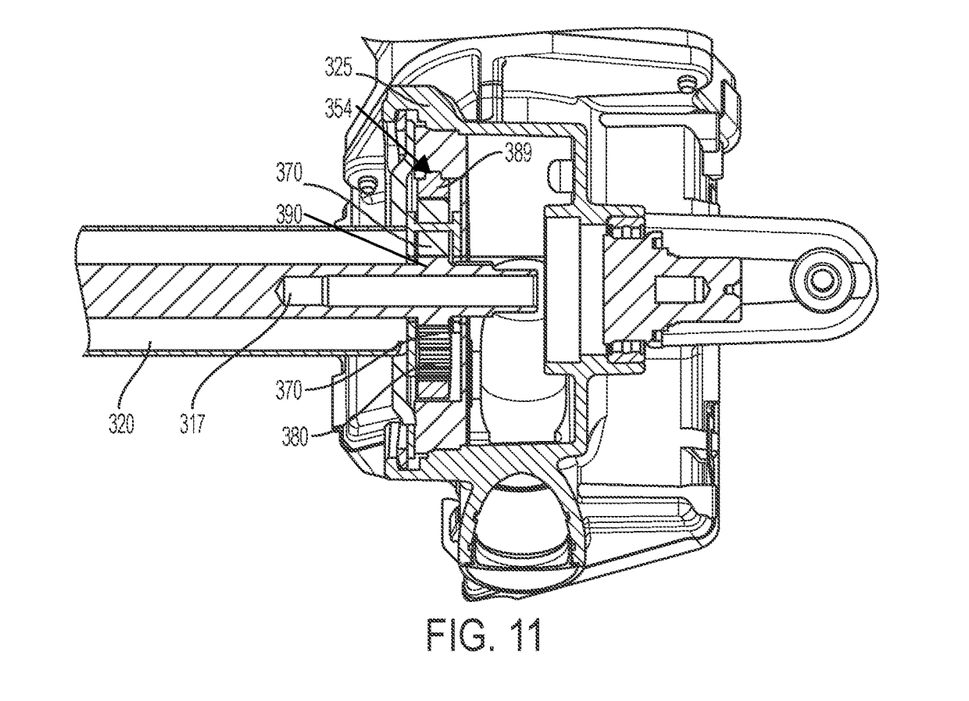
FIG. 11 is a schematic cross-sectional view of the steering system of FIG. 8.

With reference to FIGS. 10 and 11, the travel limiter assembly 314 is mounted within the housing 325 of the motor/emulator 324. The housing 325 includes a groove 354 formed in a mounting surface 326. The groove 354 is defined by a groove surface 355, an outer sidewall 356, an inner sidewall 357, and groove endwalls 358 (one endwall 358 is shown in FIG. 10). The contiguous groove surface 355, the outer sidewall 356, the inner sidewall 357, and groove endwalls 358 define the groove 354 that is depressed from a housing mounting surface 326 by a depth defined by the sidewalls 356, 357 and the endwalls 358. In some embodiments, the groove 354 is a partial circular groove. The endwalls 358 define a groove stop portion 359. The stop portion 359 interrupts the groove 354 such that the groove 354 does not define a full circular groove in the mounting surface 326. The width of the stop portion 359 is variable and may be adjusted based on the desired steering angle limit. In some embodiments, the groove 354 is machined into the mounting surface 326 during manufacture of the housing 325.

As shown in FIG. 11, when assembled within the housing 325, planet gears 370 are distributed evenly around the sun gear 390 such that the teeth of the planet gears 370 engage with the teeth of the sun gear 390. Similarly, the ring gear 380 encircles the planet gears 370 such that the teeth of the planet gears 370 mesh with the teeth of the ring gear 380. The lug 389 of the ring gear 380 fits into and travels within the groove 354 in the housing 325. In some embodiments, the length and width of the lug 389 (that is, the distance the lug 389 extends from the outer surface 381 of the ring gear 380) is variable based on, for example and without limitation, sizing and packaging constraints and the input torque being countered by the mechanical travel limiter system, among other factors.

As the steering shaft 317 rotates, the mechanical travel limiter system 314 limits the steering angle and acts as a travel stop to counter the torque of the driver/operator. For example, as the steering shaft 317 rotates in a clockwise direction (that is, in the direction indicated by the arrow 348 on FIG. 13), the sun gear 390 also rotates at the same rate. Rotation of the sun gear 390 drives rotation of each of the planet gears 370 such that each of the planet gears 370 rotates about its axis 375. The planet gears 370 are fixed with respect to the housing 325 and do not rotate in position about the sun gear 390. Rotation of the planet gears 370 drives rotation of the ring gear 380 such that the ring gear 380 rotates in the same direction as the steering shaft 317. As the ring gear 380 rotates, the lug 389 travels within the groove 354 until the lug 389 abuts one the endwalls 358 of the groove 354. Rotation of the ring gear 380 terminates when the lug 389 encounters the endwall 358, causing the other components of the travel limiter system 314 to also stop rotating, effectively limiting rotation of the steering shaft 317.

Similarly, when the steering shaft 317 rotates in the direction opposite to the arrow 348, the lug 389 of the ring gear 380 travels the other direction within the groove 354 until the lug 389 encounters the stop portion 359 defined by the other endwall 358, effectively limiting rotation of the steering shaft 317 in this direction.

Due to the difference in size/diameter between the sun gear 390 and the ring gear 380, the sun gear 390 and the steering shaft 317 rotate more quickly than the ring gear 380. The ratio between the diameter of the sun gear 390 and the ring gear 380 is adjustable to achieve the desired steering angle limit and fit within size and packaging restrictions. Additionally, the width of the stop portion 359 may be adjusted to achieve the desired steering angle limit.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A steering system for an automotive vehicle, comprising:
   a steering shaft;
   a steering column jacket encircling at least a portion of the steering shaft;
   an emulator enclosed within a housing, the emulator coupled to the steering shaft;
   a travel limiter assembly enclosed within the housing and coupled with the steering shaft, the travel limiter assembly comprising at least one rotational member having a pin and a groove configured to receive the pin, the groove including a stop portion;
   a controller configured to control the steering system and at least one vehicle sensor electrically connected to the controller, the controller configured to receive a steering position signal from the at least one vehicle sensor and generate a motor drive signal; and
   wherein the at least one rotational member and at least a portion of the steering shaft rotates within the housing and the pin travels within the groove until the pin encounters the stop portion after a predetermined degree of rotation of the steering shaft.

2. The steering system of claim 1, wherein the at least one rotational member further includes a first cam, a second cam, a third cam, and a fourth cam, each of the first, second, third, and fourth cams comprising a disk cam and the first cam is fixedly coupled to the steering column jacket and has a first groove formed in a first side surface, the second cam has a first pin extending from a first side surface, the first pin is configured to fit within the first groove and a second groove formed in a second side surface, the third cam has a second pin extending from a first side surface, the second pin configured to fit within the second groove, and a third pin extending from a second side surface, and the fourth cam is fixedly coupled to the steering shaft and has a third groove configured to receive the third pin.

3. The steering system of claim 2, wherein the fourth cam rotates with the steering shaft and the third pin travels in the third groove until reaching a third stop portion, resulting in rotation of the third cam in a same direction as the steering shaft, the second pin traveling in the second groove until reaching a second stop portion, resulting in rotation of the second cam in the same direction as the steering shaft, the first pin traveling in the first groove until reaching a first stop portion of the first groove.

4. The steering system of claim 3, wherein when the first pin reaches the first stop portion, rotation of the steering shaft is arrested.

5. The steering system of claim 2, wherein the second and third cams freely rotate with respect to the steering shaft and the fourth cam rotates with the steering shaft.

6. The steering system of claim 1, wherein the at least one rotational member is a gear.

7. The steering system of claim 6, wherein the housing comprises the groove and the stop portion and the travel limiter assembly comprises a planetary gear set including a sun gear coupled to the steering shaft, a planet carrier that supports at least one planet gear configured to engage with the sun gear, and a ring gear configured to engage with the at least one planet gear, the ring gear including the pin configured to travel within the groove as the ring gear rotates.

8. The steering system of claim 7, wherein when the pin encounters the stop portion, rotation of the steering shaft is arrested.

9. The steering system of claim 8, wherein a width of the stop portion is tunable based on a desired steering angle limit.

10. An automotive vehicle, comprising:
    a plurality of vehicle wheels; and
    a steering system comprising
      a steering shaft;
      a steering column jacket encircling at least a portion of the steering shaft;
      an emulator enclosed within a housing, the emulator coupled to the steering shaft;
      a travel limiter assembly enclosed within the housing and coupled with the steering shaft, the travel limiter assembly comprising at least one rotational member having a pin and a groove configured to receive the pin, the groove including a stop portion; and
      a controller configured to control the steering system and at least one vehicle sensor electrically connected to the controller, the controller configured to receive a steering position signal from the at least one vehicle sensor and generate a motor drive signal for steering the plurality of vehicle wheels;
    wherein the at least one rotational member and at least a portion of the steering shaft rotates within the housing and the pin travels within the groove until the pin encounters the stop portion after a predetermined degree of rotation of the steering shaft; and
    wherein the steering system is connected to the vehicle wheels for steering the vehicle wheels.

11. The automotive vehicle of claim 10, wherein a width of the stop portion is tunable based on a desired steering angle limit.

12. The automotive vehicle of claim 10, wherein the at least one rotational member further includes a first cam, a second cam, a third cam, and a fourth cam, each of the first, second, third, and fourth cams comprising a disk cam and the first cam is fixedly coupled to the steering column jacket and has a first groove formed in a first side surface, the second cam has a first pin extending from a first side surface, the first pin is configured to fit within the first groove and a second groove formed in a second side surface, the third cam has a second pin extending from a first side surface, the second pin configured to fit within the second groove, and a third pin extending from a second side surface, and the fourth cam is fixedly coupled to the steering shaft and has a third groove configured to receive the third pin.

13. The automotive vehicle of claim 12, wherein the fourth cam rotates with the steering shaft and the third pin travels in the third groove until reaching a third stop portion, resulting in rotation of the third cam in the same direction as the steering shaft, the second pin traveling in the second groove until reaching a second stop portion, resulting in rotation of the second cam in the same direction as the steering shaft, the first pin traveling in the first groove until reaching a first stop portion of the first groove.

14. The automotive vehicle of claim 13, wherein when the first pin reaches the first stop portion, rotation of the steering shaft is arrested.

15. The automotive vehicle of claim 10, wherein the housing comprises the groove and the stop portion and the travel limiter assembly comprises a planetary gear set including a sun gear coupled to the steering shaft, a planet carrier that supports at least one planet gear configured to engage with the sun gear, and a ring gear configured to engage with the at least one planet gear, the ring gear including the pin configured to travel within the groove as the ring gear rotates.

16. The automotive vehicle of claim 15, wherein when the pin encounters the stop portion, rotation of the steering shaft is arrested.

\* \* \* \* \*